(12) United States Patent
McHugh

(10) Patent No.: US 11,579,572 B2
(45) Date of Patent: *Feb. 14, 2023

(54) METHOD OF, AND A SYSTEM FOR, DRILLING TO A POSITION RELATIVE TO A GEOLOGICAL BOUNDARY

(71) Applicant: Technological Resources Pty Ltd, Melbourne (AU)

(72) Inventor: Charles Benjamin McHugh, Kensington (AU)

(73) Assignee: Technological Resources Pty Limited, Melbourne (AU)

( * ) Notice: Subject to any disclaimer, the term of this patent is extended or adjusted under 35 U.S.C. 154(b) by 17 days.

This patent is subject to a terminal disclaimer.

(21) Appl. No.: 17/028,082

(22) Filed: Sep. 22, 2020

(65) Prior Publication Data

US 2021/0109488 A1    Apr. 15, 2021

Related U.S. Application Data

(63) Continuation of application No. 14/412,049, filed as application No. PCT/AU2013/000734 on Jul. 5, 2013, now Pat. No. 10,824,123.

(30) Foreign Application Priority Data

Jul. 6, 2012 (AU) ................................ 2012902919

(51) Int. Cl.
*G01M 1/38* (2006.01)
*G05B 13/04* (2006.01)
(Continued)

(52) U.S. Cl.
CPC .............. *G05B 13/04* (2013.01); *E21B 44/02* (2013.01); *E21B 45/00* (2013.01); *E21B 47/00* (2013.01);
(Continued)

(58) Field of Classification Search
CPC ....................................................... G05B 13/04
(Continued)

(56) References Cited

U.S. PATENT DOCUMENTS 5,566,772 A * 10/1996 Coone ..................... E21B 17/07
166/242.7
6,612,382 B2    9/2003 King
(Continued)

FOREIGN PATENT DOCUMENTS

CL    200901144    8/2010
CL    201103014    6/2012
(Continued)

OTHER PUBLICATIONS

Aug. 24, 2016—Chinese First Office Action—App 201380035788.3.
(Continued)

*Primary Examiner* — Evral E Bodden
(74) *Attorney, Agent, or Firm* — Banner & Witcoff, Ltd.

(57) ABSTRACT

A system for mining material in a seam under an overburden layer using a geological model map of a geological formation, including a desired drilling end point at a predefined position relative to a geological boundary between the overburden layer and seam. A drill controller controls operation of a drill drilling a blast hole. A sensor pack senses, while drilling the blast hole, blast hole drilling operation parameters; and feeds the sensed parameters in real time to the drill controller. A data storage module stores a geological model of the geological formation and sensed parameters data. A processor module generates a geological model map including the desired drilling end point and locates the drill bit position relative to the geological boundary and such end point. The drill controller drills to the desired drilling end point and causes the drill to stop drilling upon reaching such end point.

19 Claims, 6 Drawing Sheets

(51) Int. Cl.
  *E21B 47/00* (2012.01)
  *G06T 17/05* (2011.01)
  *E21C 41/26* (2006.01)
  *E21B 47/09* (2012.01)
  *E21B 45/00* (2006.01)
  *E21B 47/06* (2012.01)
  *E21B 44/02* (2006.01)
  *G01V 99/00* (2009.01)
  *G01V 3/38* (2006.01)
  *G01V 3/08* (2006.01)

(52) U.S. Cl.
  CPC .............. *E21B 47/06* (2013.01); *E21B 47/09* (2013.01); *E21C 41/26* (2013.01); *G01V 99/005* (2013.01); *G06T 17/05* (2013.01); *G01V 3/08* (2013.01); *G01V 3/38* (2013.01)

(58) Field of Classification Search
  USPC ........................................................ 700/275
  See application file for complete search history.

(56) References Cited

U.S. PATENT DOCUMENTS

| | | | |
|---|---|---|---|
| 9,027,673 B2 * | 5/2015 | Vail, III | ............ E21B 7/00 175/94 |
| 9,103,936 B2 | 8/2015 | Calleja et al. | |
| 9,347,308 B2 | 5/2016 | Benson et al. | |
| 9,483,586 B2 | 11/2016 | Bailey et al. | |
| 2011/0067928 A1 | 3/2011 | Hulden et al. | |
| 2013/0161096 A1 * | 6/2013 | Benson | ............ E21B 44/00 175/26 |
| 2013/0223187 A1 * | 8/2013 | Thapar | ............ G01V 1/00 367/73 |
| 2015/0185715 A1 | 7/2015 | McHugh | |
| 2019/0040686 A1 | 2/2019 | Wang et al. | |

FOREIGN PATENT DOCUMENTS

| | | | | |
|---|---|---|---|---|
| JP | 3407883 B2 * | 5/2003 | | |
| JP | 3407883 B2 | 5/2003 | | |
| WO | 2004055325 A1 | 7/2004 | | |
| WO | 2004090285 A1 | 10/2004 | | |
| WO | 2005119298 A2 | 12/2005 | | |
| WO | 2010078615 A1 | 7/2010 | | |
| WO | 2010129998 A1 | 11/2010 | | |
| WO | 2010132927 A1 | 11/2010 | | |
| WO | 2011094817 A1 | 8/2011 | | |
| WO | WO-2011094817 A1 * | 8/2011 | ............ | E21C 39/00 |
| WO | 2012012830 A1 | 2/2012 | | |
| WO | 2012051665 A1 | 4/2012 | | |
| WO | 2012068629 A1 | 5/2012 | | |

OTHER PUBLICATIONS

Oct. 19, 2016—Chilean Office Action—App 201500009.
International Search Report dated Oct. 2, 2013 (PCT/AU2013/000734); ISA/AU.
International Preliminary Examination report under Chapter II (PCT/AU2013/000734); IPEA/AU.

* cited by examiner

METHOD OF, AND A SYSTEM FOR, DRILLING TO A POSITION RELATIVE TO A GEOLOGICAL BOUNDARY

CROSS-REFERENCE TO RELATED APPLICATIONS

This application is a continuation application of U.S. application Ser. No. 14/412,049, filed Dec. 30, 2014, now U.S. Pat. No. 10,824,123, which is a national phase application under 35 U.S.C. § 371 of International Application No. PCT/AU2013/000734, filed on Jul. 5, 2013, which claims the benefit of Australian Provisional Patent Application No 2012902919 filed on Jul. 6, 2012, the contents of which are incorporated in this specification by reference in their entirety.

TECHNICAL FIELD

This disclosure relates, generally, to drilling technology and, more particularly, to a method of, and a system for, drilling to a position relative to a geological boundary.

BACKGROUND

At present, when mining metals or minerals that occur in stratigraphic bands such as, for example, coal, diamonds or copper, boreholes are drilled to a defined depth into stratigraphy using an operator-controlled drill to enable a waste blast to be performed to remove the overburden. If, for example, in an open-cut mine it is required to drill holes to the stratigraphic boundary separating overburden from a seam of material to be mined, the operator typically drills a certain number of boreholes into the seam and detects penetration of the seam by the colour of material deposited at a collar generated about an entrance to the borehole during the drilling operation.

Standard procedure is to drill every fifth borehole into the seam and use the information gathered about the depth of the seam to inhibit penetration of the remaining boreholes into the seam to minimise the amount of seam material being removed with the overburden when subsequent blasting occurs. However, in practice it is common for all boreholes to be drilled into the seam. This results in a great deal of valuable seam material being lost when subsequent blasting occurs and the penetrated seam material is removed together with the overburden.

SUMMARY

In a first aspect, there is provided a method of drilling to a position relative to a geological boundary in a geological formation, the method including sensing borehole parameters while a borehole is being drilled in the geological formation;

feeding the sensed parameters to a controller which controls operation of a drill drilling the borehole;

using the sensed parameters to locate the position of a drill bit of the drill in the geological formation and its corresponding position within a geological model of the geological formation being drilled;

using the sensed parameters and the geological model also to locate the position of the drill bit of the drill relative to the geological boundary; and using the controller to drill to the end point.

The method may include selecting the end point by detecting a stratigraphic band arranged above the geological boundary; and selecting a location relative to the stratigraphic band as the end point.

The method may include updating the geological model using the parameters sensed during drilling. In an embodiment, the method may include updating the geological model during drilling of a current borehole to the end point relative to the geological boundary for a subsequent borehole to be drilled.

The method may include sensing the borehole parameters using measurement-while-drilling (MWD) data. The method may include selecting the parameters from the group consisting of: weight on drill bit, rate of penetration, rotation rate, bit torque, temperature, depth, translation of the X, Y, and Z axes (XYZ translation), gas pressure, spectral scan data, and combinations of the foregoing. Further, the method may include updating the geological model in real time during the drilling operation using the MWD data.

In an embodiment, the controller may be an autonomous controller and the method may include selecting the end point to be the geological boundary. In another embodiment, the controller may be controlled by an operator and the method may include alerting the operator when the end point is reached so that the operator can control the drill to avoid or minimise penetration of the geological boundary.

In a second aspect there is provided a method of drilling to a position relative to a geological boundary in a geological formation, the method including sensing borehole parameters while a borehole is being drilled in the geological formation;

using a geological model of the geological formation including the geological boundary to determine an end point at a defined position relative to the boundary feeding the sensed parameters and the end point to a controller which controls operation of a drill drilling the borehole;

using the controller to drill to the end point; and updating the geological model using the sensed parameters and updating the end point for a subsequent hole to be drilled.

In a third aspect, there is provided a system for drilling to a position relative to a geological boundary in a geological formation, the system including a sensor pack for sensing parameters associated with a drilling operation carried out in the geological formation by a drill;

a data storage module for storing a geological model of the geological formation and data relating to the sensed parameters, the geological model including data relating to the geological boundary;

a processor module configured to monitor the drilling operation using the data related to the sensed parameters and to locate the position of a drill bit of the drill in the geological formation and its corresponding position within the geological model, the processor module being further configured to generate an end point arranged at a defined position relative to the geological boundary; and a drill controller in communication with the processor module, the drill controller being configured to control operation of the drill and to cause the drill to cease drilling when the end point has been reached.

The system processor module may be configured to select the end point by detecting a stratigraphic band arranged above the geological boundary; and selecting a location relative to the stratigraphic band as the end point.

The processor module may be operable to update the geological model using the parameters sensed during drilling. In an embodiment, the processor module may update the geological model during drilling of a current borehole to estimate the end point relative to the geological boundary for a subsequent borehole to be drilled by the drill.

The sensor pack may use measurement-while-drilling (MWD) sensors. The sensor pack may comprise sensors selected from the group consisting of: weight on drill bit, rate of penetration, rotation rate, bit torque, temperature, depth, XYZ translation, gas pressure, spectral scan data, and combinations of the foregoing.

The processor module may be configured to update the geological model in real time on receipt of data from the sensor pack.

In an embodiment, the drill may be an autonomous drill and the drill controller may be operable under the action of the processor module to cease drilling when the end point has been reached. In another embodiment, the drill may be an operator-controlled drill and the controller may be responsive to commands from the operator to cease drilling when the end point has been reached.

In a fourth aspect, there is provided a system for drilling to a position relative to a geological boundary in a geological formation, the system including a sensor pack for sensing parameters associated with a drilling operation carried out in the geological formation by a drill;

a data storage module for storing a geological model of the geological formation including the geological boundary, the data storage module further storing an end point arranged at a defined position relative to the geological boundary;

a processor module configured to monitor the drilling operation;

a drill controller in communication with the processor module, the drill controller being configured to control operation of the drill and to cause the drill to cease drilling when the end point has been reached; and the processor module further being configured to use the sensed parameters to update the end point for a subsequent hole to be drilled by the drill.

The processor module may be configured to generate the end point which is then stored in the data module.

The disclosure extends also to software that, when installed on a computer, causes the computer to perform any of the methods described above.

In a fifth aspect, there is provided a drill which includes
a drilling platform;
a support structure mounted on the platform;
a drilling mechanism displaceably supported by the support structure, the drilling mechanism terminating in a drill bit for drilling a borehole; and
a drill controller carried on the drilling platform, the drill controller being operative to control operation of the drilling mechanism and the drill controller further being responsive to commands to cease drilling when the drill bit reaches an end point arranged at a defined position relative to a geological boundary.

The drill may include a sensor pack for sensing parameters relating to a drilling operation.

BRIEF DESCRIPTION OF DRAWINGS

Embodiments of the disclosure are now described by way of example only with reference to the accompanying drawings in which:—

DETAILED DESCRIPTION OF EXEMPLARY EMBODIMENTS

In open cut mining, overburden needs to be removed to access the metals or minerals (the "materials of interest") to be mined. Particularly in the case where the material of interest occurs in the form of a seam, a problem arises when boreholes are drilled through the overburden in that the boreholes penetrate the seam. When the boreholes are subsequently charged with explosives and the explosives are detonated, that part of the seam which has been penetrated is removed together with the overburden.

It will be appreciated that, with the increasing economic value of the materials of interest, for example, coal, even the removal of a small amount of material from the seam during a waste blast to remove overburden could result in substantially less revenue being generated for the mine.

While the present disclosure is of benefit in numerous applications, for ease of explanation, the present disclosure will be described with reference to its application to open-cut coal mining. Those skilled in the art will, however, appreciate that the present disclosure could readily be applied to other mining applications and, in particular, where the material of interest occurs in seams. Thus, the present disclosure is also readily applicable, for example, to diamond mining, copper mining, etc. It will further be appreciated that the present disclosure could be applied in underground mining applications as well where it is necessary or desirable to drill to a seam of a material of interest.

Figure 1:
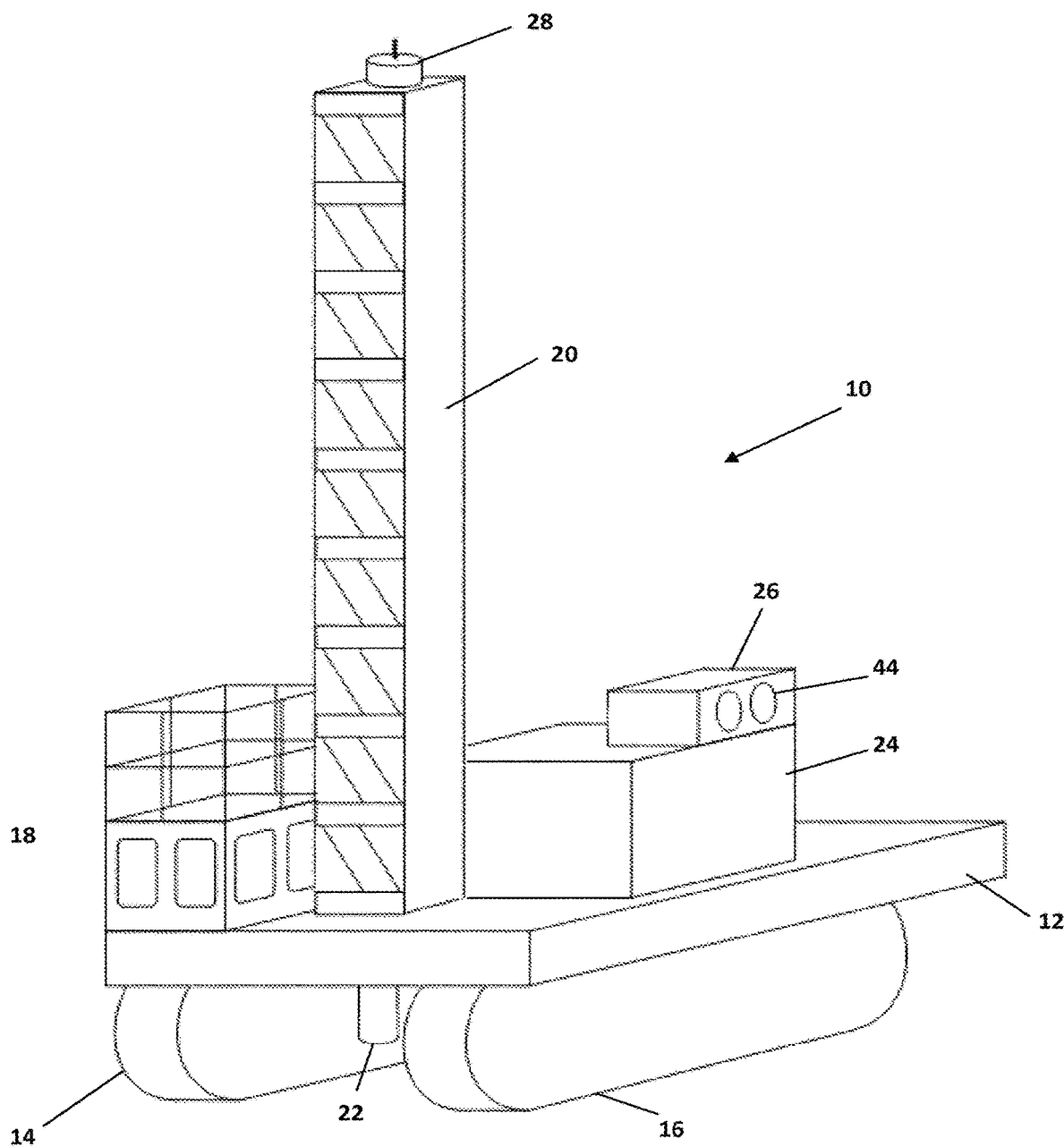
FIG. 1 shows a schematic, perspective view of a drill to be controlled.

To aid in the description of the system and method of the disclosure, reference is initially made to FIG. 1 of the drawings in which reference numeral 10 generally designates a self-propelled drilling rig, or drill, 10. The drill 10 comprises a platform 12 supported on displacing elements, generally in the form of tracked members, or tracks, 14, 16. A cabin 18 is arranged on the platform 12 and may or may not be populated by an operator depending on the mode of operation of the drill 10. In the case of more recent, fully autonomous drills 10, the cabin 18 is omitted.

A support structure in the form of a drill mast 20 projects upwardly from the platform 12. A drill string (not shown) is supported by the drill mast 20, the drill string terminating, at its operatively lower end, in a drill bit 22.

The drill 10 includes a drill controller 24 which is used for driving the tracks 14, 16 to propel the drill 10 over terrain, such as a bench of an open cut, in which boreholes are to be drilled. The drill controller 24 also controls operation of the drill string supported by the drill mast 20 and includes drive mechanisms for rotationally driving the drill string and percussive members for operating the drill string in a hammer or percussive mode.

The drill 10 includes a sensor pack 26. The sensor pack 26 comprises various sensors as will be described in greater detail below. In particular, the sensors of the sensor pack 26 are measurement-while-drilling (MWD) sensors. The sensor pack 26 also includes a position determining sensor such as, for example, a GPS sensor 28 for determining the location of the drill 10 and the borehole drilled by the drill 10.

Figure 2:
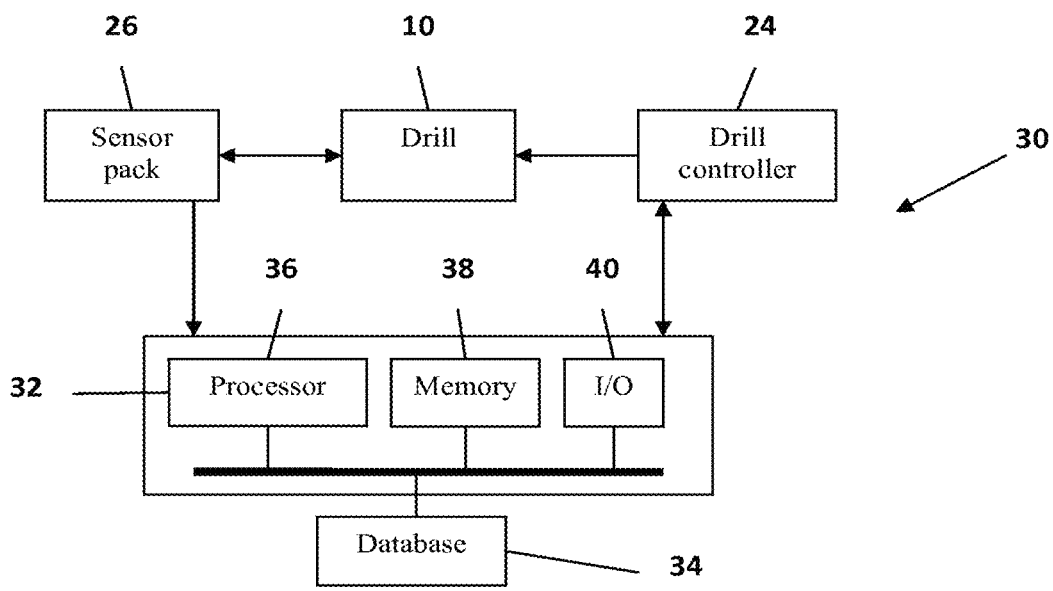
FIG. 2 shows a block diagram of an embodiment of a system for drilling to a position relative to a geological boundary in a geological formation.

Referring now to FIG. 2 of the drawings, an embodiment of a system for drilling to a position relative to a geological boundary in a geological formation is illustrated and is designated generally by the reference numeral 30. The system 30 includes the drill controller 24 and the sensor pack 26 referenced above. The sensor pack 26 communicates with components of the drill 10 and, in particular, the drill string and drill bit 22 for monitoring a drilling operation carried out by the drill 10 under the control of the drill controller 24.

A processor module 32 receives data from the sensor pack 26 and uses the sensor data to update a geological model 46 (FIG. 3) of the region being drilled and/or to generate the geological model 46 as will be described in greater detail below. The system 10 includes a data storage module, or database, 34 in which data relating to the parameters sensed by the sensor pack 26 are stored and which is accessible by the processor module 32. The data are used by the processor module 32 to enable the geological model 46 to be generated or updated. A geological model 46 which has been previously generated is stored in the database 34.

The processor module 32 includes a processor 36, associated memory 38 and input/output devices 40 communicating with each other and the database 34 via a bus 42. The processor module 32 may either be arranged on the drill 10 or remotely from the drill 10 depending on the mode of operation of the drill 10. In the latter case, the processor module 32 may be configured to operate the drill 10 in a remote control manner or to allow the drill 10 to operate autonomously.

The memory 38 stores code for execution by the processor 36 to perform the method of the disclosure. The input/output devices 40 include a display device 42, such as display screen, for displaying a display 50 such as that shown in FIG. 5 of the drawings.

The sensor pack 26 includes a plurality of individual sensors 26.1-26.*n* and also includes the position determining sensor 28. The sensors 26.1-26.*n* include a weight on bit sensor, a rate of penetration sensor (which may measure pull down rate on the drill string), a rotation rate, a drill bit torque sensor, a temperature sensor, a depth sensor, XYZ translation sensors, one or more gas pressure sensors and one or more geophysical sensors for conducting spectral analysis of core samples removed from the drill in situ. For this purpose, the sensor pack 26 includes spectral scanning sensors 44 (FIG. 1) mounted on the drill platform 12 to enable real time spectral analysis of a borehole sample, in the form of drill chips, removed from the drill string to be conducted. The spectral analysis may incorporate gamma ray detection, neutron detection, or the like either on the drill chips or down the hole on the drill string proximate the drill bit 28. The geophysical sensors may also detect in-ground parameters such as gamma radiation occurring in the borehole being drilled by the drill 10.

Figure 3:
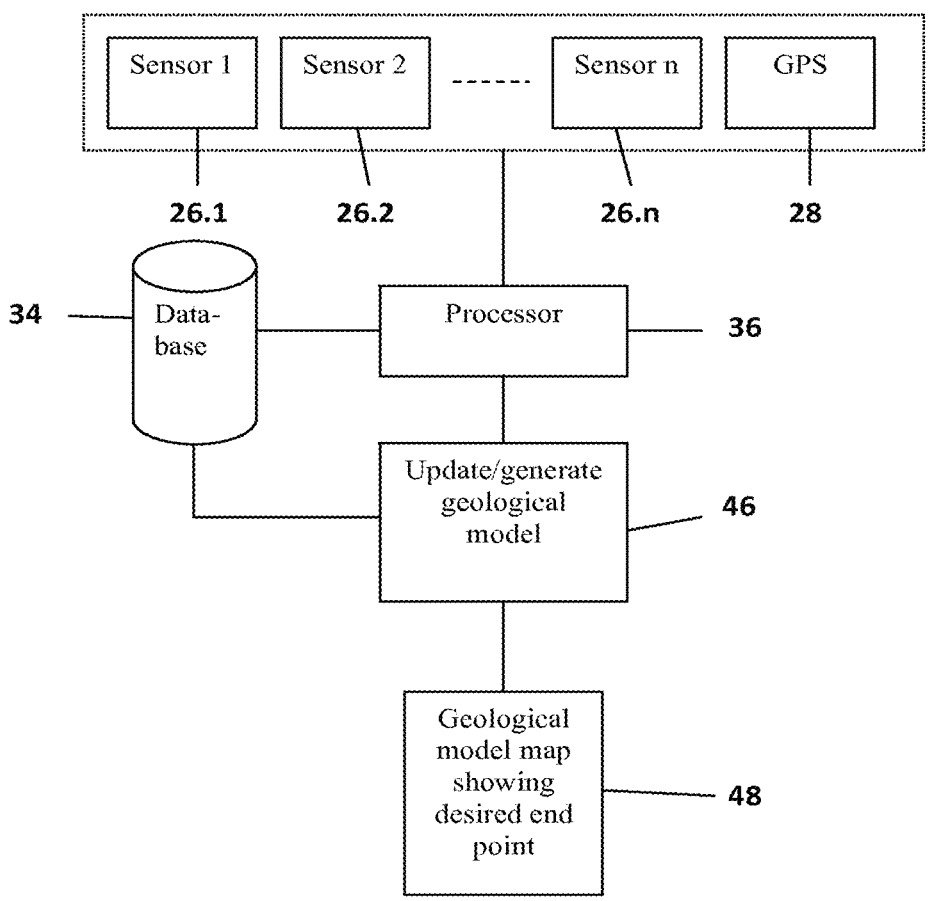
FIG. 3 shows a block diagram of the operation of a processor module of FIG. 2.

As illustrated in FIG. 3 of the drawings, the processor 36 of the processor module 32 is configured to receive data from a plurality of the sensors 26.1-26.*n* of the sensor pack 26 to conduct a real time analysis of the stratigraphic layers being drilled by the drill bit 22 of the drill 10. In one embodiment, the processor 36 updates a previously provided geological model 46 in real time. In another embodiment, the processor 36 uses sensor data from the sensor pack 26 to generate a model of the geological formation in real time as the drilling operation proceeds.

International Patent Application No. PCT/AU2011/000116 dated 4 Feb. 2011 in the name of The University of Sydney and entitled "Rock property measurements while drilling", discloses a method of, and a system for, characterising in-ground rock types from measurement-while-drilling data in a mining environment. The disclosure of the international patent application provides a useful basis for generating a geological model for a region of interest being drilled and the contents of the application are incorporated herein by reference in their entirety.

Another useful disclosure for obtaining a geological model for the region of interest being drilled is International Patent Application No. PCT/AU2010/000522 dated 12 May 2010 in the name of The University of Sydney and entitled "A method and system for data analysis and synthesis", the contents of which are incorporated herein by reference in their entirety.

Yet another useful disclosure for obtaining a geological model for the region of interest being drilled is International Patent Application No. PCT/AU2011/001342 dated 21 Oct. 2011 in the name of The University of Sydney and entitled "Method for large scale, non-reverting and distributed spatial estimation", the contents of which are incorporated herein by reference in their entirety.

Still a further useful disclosure for obtaining a geological model for the region of interest being drilled is International Patent Application No. PCT/AU2009/001668 dated 21 Dec. 2009 in the name of The University of Sydney and entitled "A method and system of data modelling", the contents of which are incorporated herein by reference in their entirety.

The geological models of any of the above international patent applications, suitably modified if necessary, can thus be used as the initial geological model for the present disclosure. It will, however, be appreciated that any other suitable geological model, if available, could be employed as an initial geological model of the geological formation being, or to be, drilled.

While the above international applications provide reasonable bases for models which enable boundaries between stratigraphic layers to be determined or inferred, the international applications do not or may not provide boundary data with sufficient accuracy to minimise penetration of a seam of the material of interest.

Figure 7:
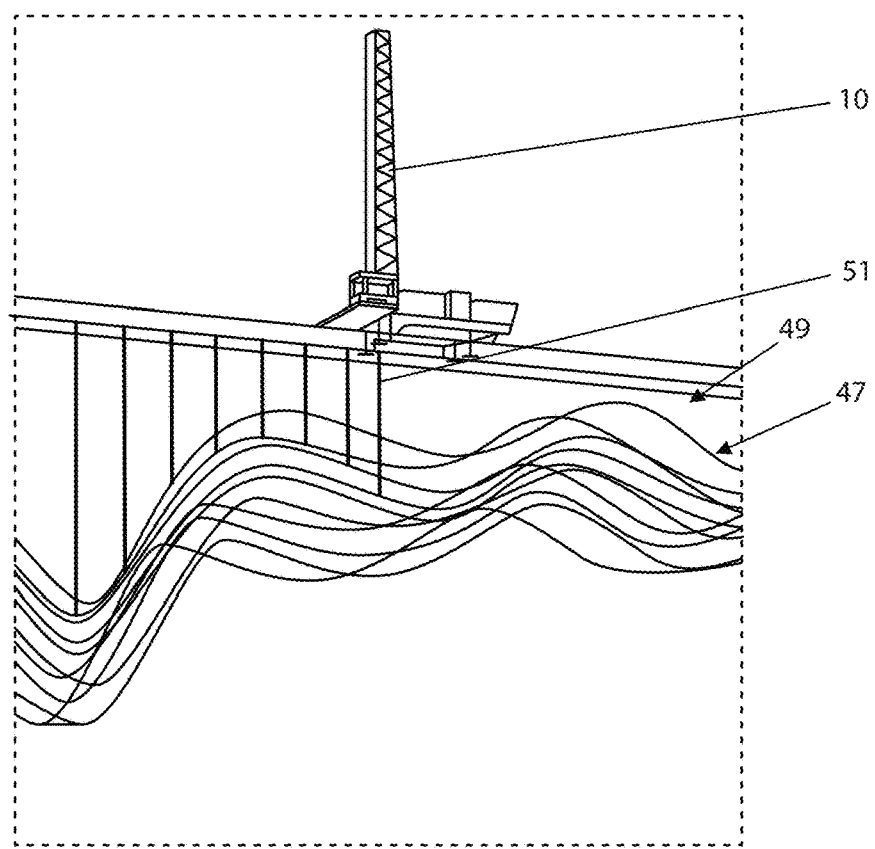
FIG. 7 shows a schematic representation of the geology of a geological formation to be drilled indicating the varying nature of stratigraphic bands of the geological formation.

For example, as shown in FIG. 7, stratigraphic layers 47 of a geological formation 49 may undulate significantly or there may be a fault (not shown) intersecting the layers 47 causing displacement of the layers 47 on opposite sides of the fault. Hence, the previously generated or inferred geological model 46 may not be a sufficiently accurate representation of the geological formation 49. By updating the model 46 using data generated from the sensor pack 26, the model 46 can be updated during the drilling operation to improve the accuracy of the model 46.

A particular benefit of the disclosure is that the system 30 affords the benefit of updating the model 46 for a subsequent borehole (not shown) to be generated. Hence, when the data from the current borehole 51 being drilled are received, the processor module 32 is configured to analyse the sensor data from that borehole 51 (and previous boreholes if necessary) to compare the data with stored data relating to the geological model and to update the geological model 46 for the subsequent borehole to be drilled. In this way the accuracy of the subsequent borehole to be drilled is improved and there is a lower likelihood of penetrating the seam containing the material of interest.

Hence, the processor 36 of the processor module 32 of the system 30 receives the relevant data from the sensors 26.1-26.$n$ of the sensor pack 26, the data if necessary, including data from the position determining sensor 28. The processor 36 accesses the geological model 46 in the database 32 and updates the data contained in the geological model 46 using real time data obtained from the sensor pack 26. From this, an updated geological model 46 (FIG. 3) is provided and a geological model map 48, containing a desired end point to which to drill a borehole, is generated. The geological model map 48 is provided by the processor module 32 to the drill controller 24 to control operation of the drill 10.

The geological model map 48 is displayed as a display 50 on the display screen 42 and is visible to an operator, whether situated remotely from the drill 10 or on the drill 10, or a person monitoring operations, in the case of an autonomous drill 10. The display 50 comprises a three-dimensional view 52 of a bench 54 being drilled by the drill 10 as well as a cross-sectional display 56. The cross-sectional display 56 of the map 48 shows an overburden layer 58 such as, for example, shale, separated from a seam 60 of coal to be mined by a boundary 62, the boundary 62 being the top of the coal seam 60 of interest. The display 50 further shows a plurality of boreholes 64 drilled or to be drilled to an end point which, in this embodiment, is at the boundary 62. Instead of the end point being at the boundary, the end point could, instead, be a predetermined stand-off distance 'd' (FIG. 8) above the boundary 62 as will be described in greater detail below.

While the end point has been described as a physical location in the geological model map 48, it will be appreciated that the end point could be defined in other ways. For example, the end point could be established by the processor module 32 determining that a plurality of parameters sensed by relevant sensors of the sensor pack 26 have each reached a predetermined value, the values of those parameters together defining the end point.

It will be appreciated that, instead of using the geological model provided by the above referenced international patent applications, data relating to the bench 54 could be sourced in other ways, for example, by pre-drilling a number of holes in the bench 54 to infer the stratigraphic layout of the bench 54.

In the case of an autonomous drill 10, the drill controller 24 receives updated information, in real time, from the processor module 32 of the geological model 46 and the end point on the map 48. The position of the end point of that particular borehole 64 being drilled is defined as the boundary 62 which is the transition between the overburden 58 and the coal seam 60 or, instead, the end point is the predetermined stand-off distance 'd' from the boundary 62.

In the case of a remotely controlled drill 10, the display screen 42 is monitored by an operator. The processor module 32 sends instructions to the drill controller 24 to terminate drilling at the end point. In this case, the end point is arranged to be above the boundary 62, for example, when a stratigraphic layer above the seam 60 is penetrated so that the operator is able to control the drill 10 to ensure that the drill bit 22 does not penetrate the coal seam 60 or penetrates the coal seam 60 only to a minimal extent.

The drill 10 could also be operated by an operator seated in the cab 18 of the drill 10. In that case, the operator, either by monitoring the display 50 on the display screen 42 mounted in the cab 18, or after receiving instructions from a remote site, operates the drill controller 24 to cause the drill controller 24 to stop drilling when the drill bit 22 reaches the end point. Once again, in this case, the end point may be upstream of the boundary 62 to enable the operator to control the drill 10 to ensure that the drill bit 22 does not penetrate the coal seam 60 at all or only to a minimal extent.

Figure 6:
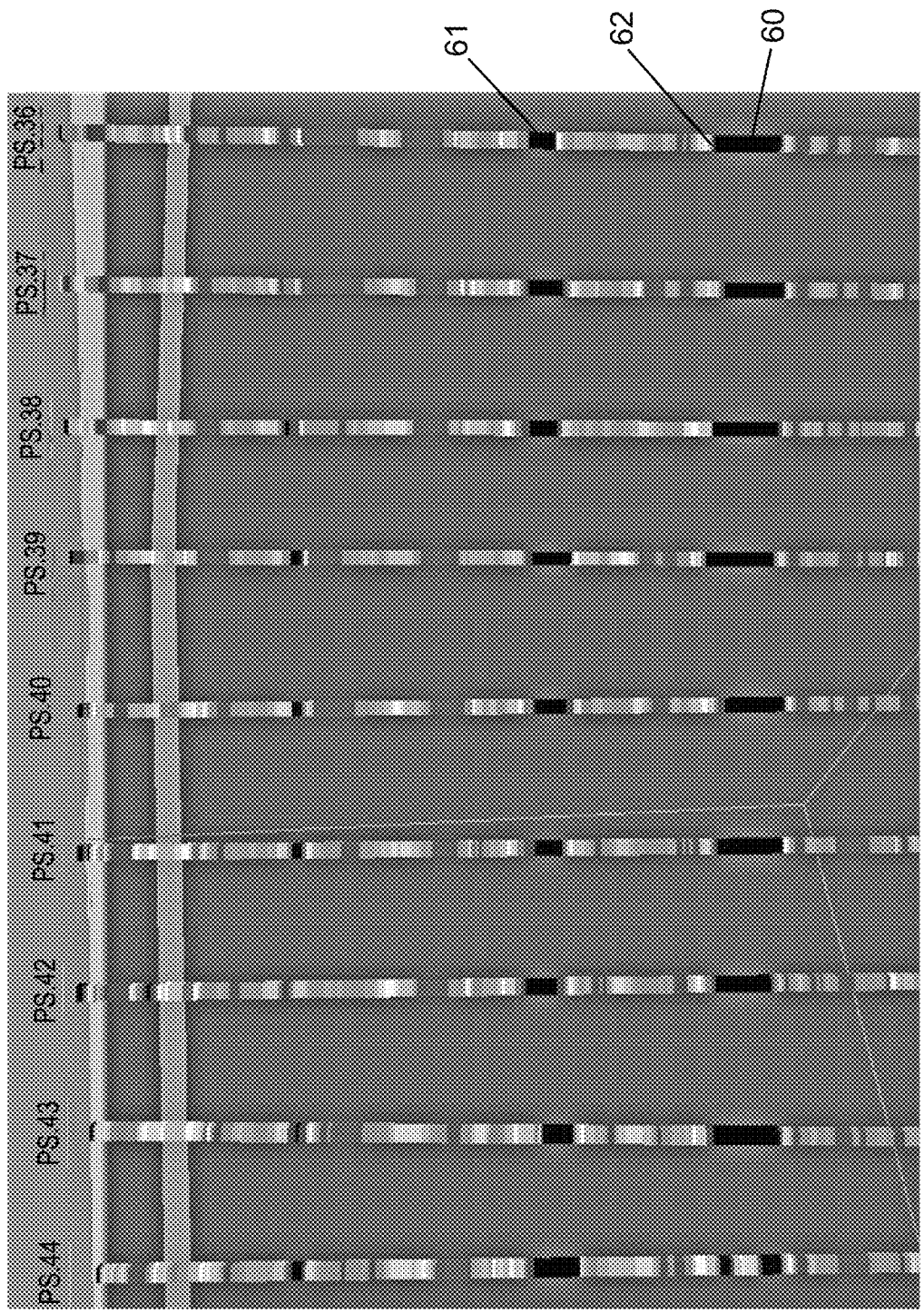
FIG. 6 shows a plot of exploration holes indicating different stratigraphic bands in the geological formation to be drilled.
Figure 8:
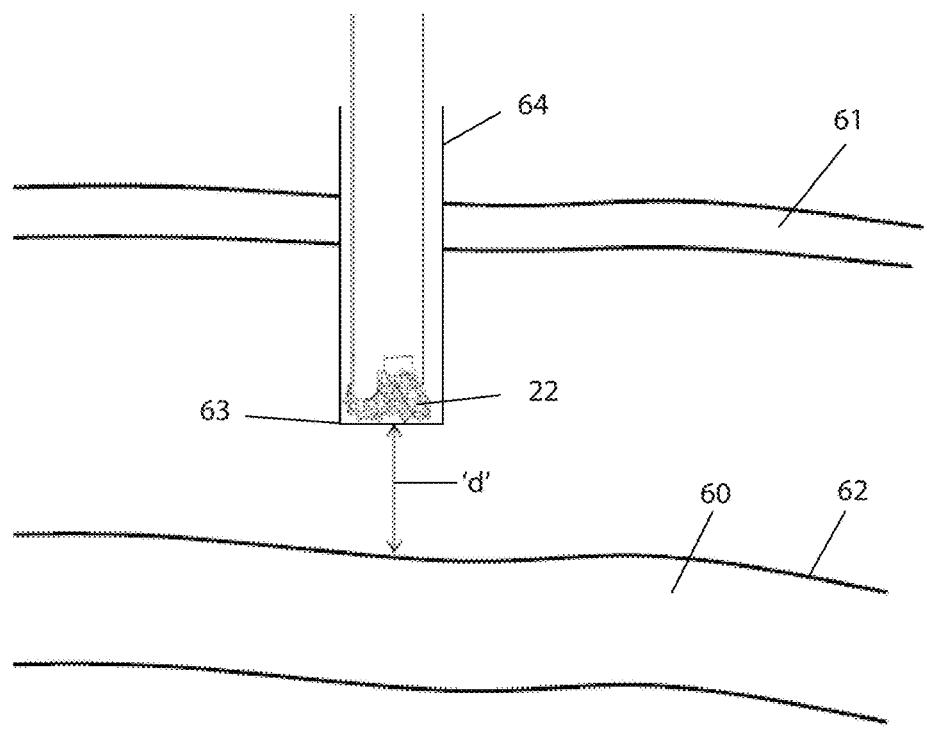
FIG. 8 shows a schematic representation of a blast hole being drilled to an end point.

In the two latter cases, i.e. the remotely controlled drill 10 or the operator controlled drill 10, the system 30 may be operable to select a sub-economic seam of the material of interest as a marker band defining the end point for each hole to be drilled. FIG. 6 of the drawings shows a plot of exploration holes previously drilled from which the geology of the geological formation has been inferred and from which the geological model 46 has been generated. FIG. 8 shows a schematic representation of a blast hole being drilled to an end point 63 arranged at a stand-off distance 'd' above the boundary 62 of the seam 60.

Figure 5:
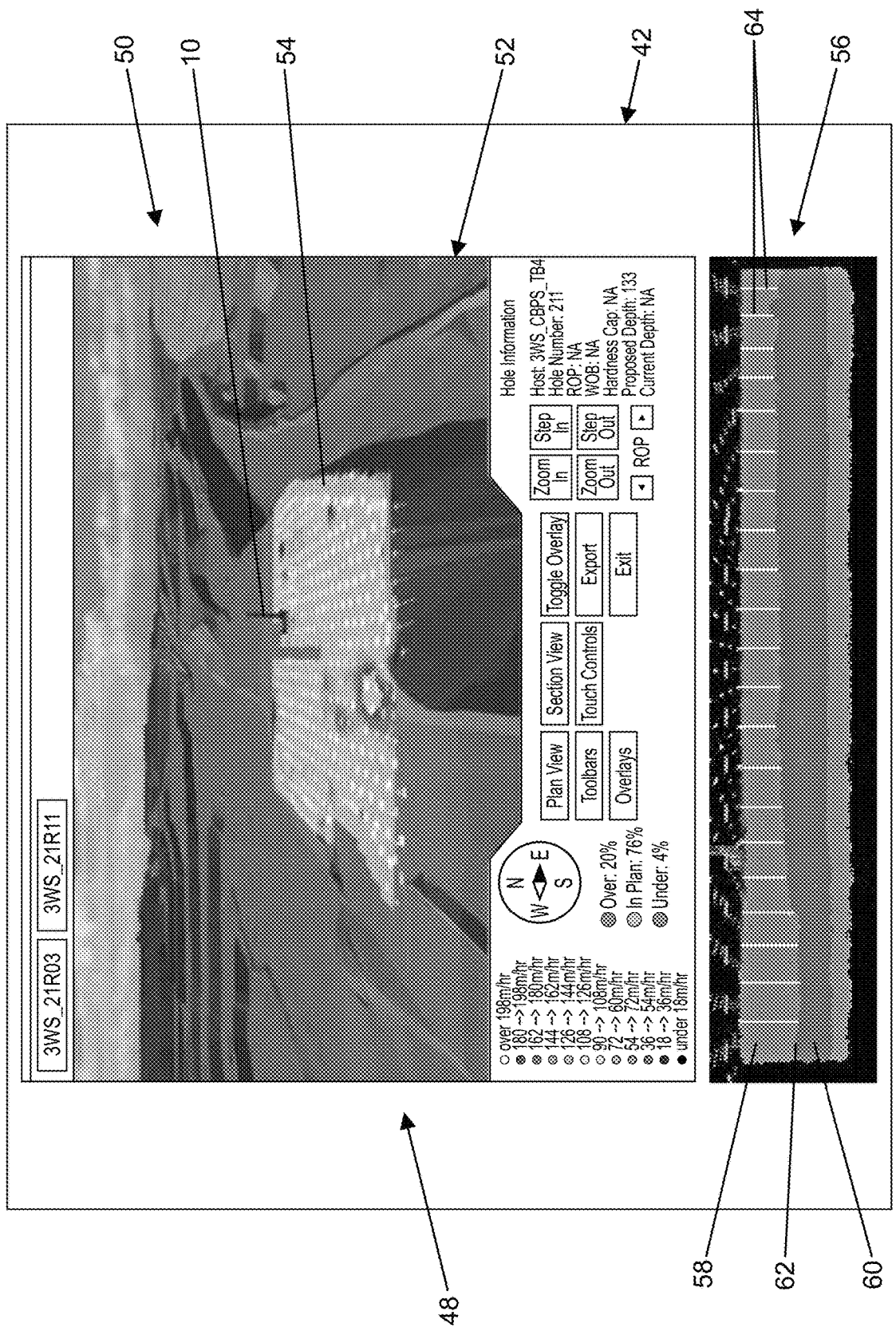
FIG. 5 shows an example of a graphical display of the system.

The seam containing the material of interest to be extracted is shown at 60 corresponding to the seam 60 in FIG. 5 of the drawings. A stratigraphic layer defining a marker band 61 overlies, and is spaced vertically above, the seam 60, the layer being a sub-economic layer of coal (or other mineral of interest) or it may be a geological layer of a different geology to the seam 60 to be extracted.

The processor module 32 is configured to identify the marker band 61. Various ways of identifying the marker band 61 may be employed. One method may include, for example, using a characteristic rock hardness measure of the marker band 61 at an expected depth. The rock hardness measure may, for example, use Adjusted Penetration Rate from the MWD data of the drill 10 as described in the 2012 IEEE International Conference Paper on Robotics and Automation entitled "Automatic Rock Recognition from Drilling Performance Data" by Zhou et al.

The processor module 32 sets the end point 63 to which the hole 64 is to be drilled at a predetermined distance below the marker band 61 to define the stand-off distance 'd' from the end point 63 to the boundary 62 at the top of the seam 60. For example, this stand-off distance 'd' may be about 300 mm-500 mm above the boundary 62. In this way, the operator controls the drill 10 to cease drilling at the end point 63 below the marker band 61. Drilling to a depth below the marker band 61 as defined by the end point 63, but terminating drilling at the stand-off distance 'd' above the seam 60 prevents or minimises penetration of the seam 60 allowing more economically beneficial extraction of the seam 60 to occur. The marker band 61 is selected to be a stratigraphic layer that is easily detectable and has relatively constant spacing from the boundary 62 of the seam 60.

While the use of the marker band 61 as the stand-off datum line has been described with reference to its application in the case of an operator-controlled drill 10, whether remotely controlled or by an operator accommodated on the drill 10, it will be understood that this marker band 61 could also be used in the case of an autonomously operated drill if desired.

Figure 4:
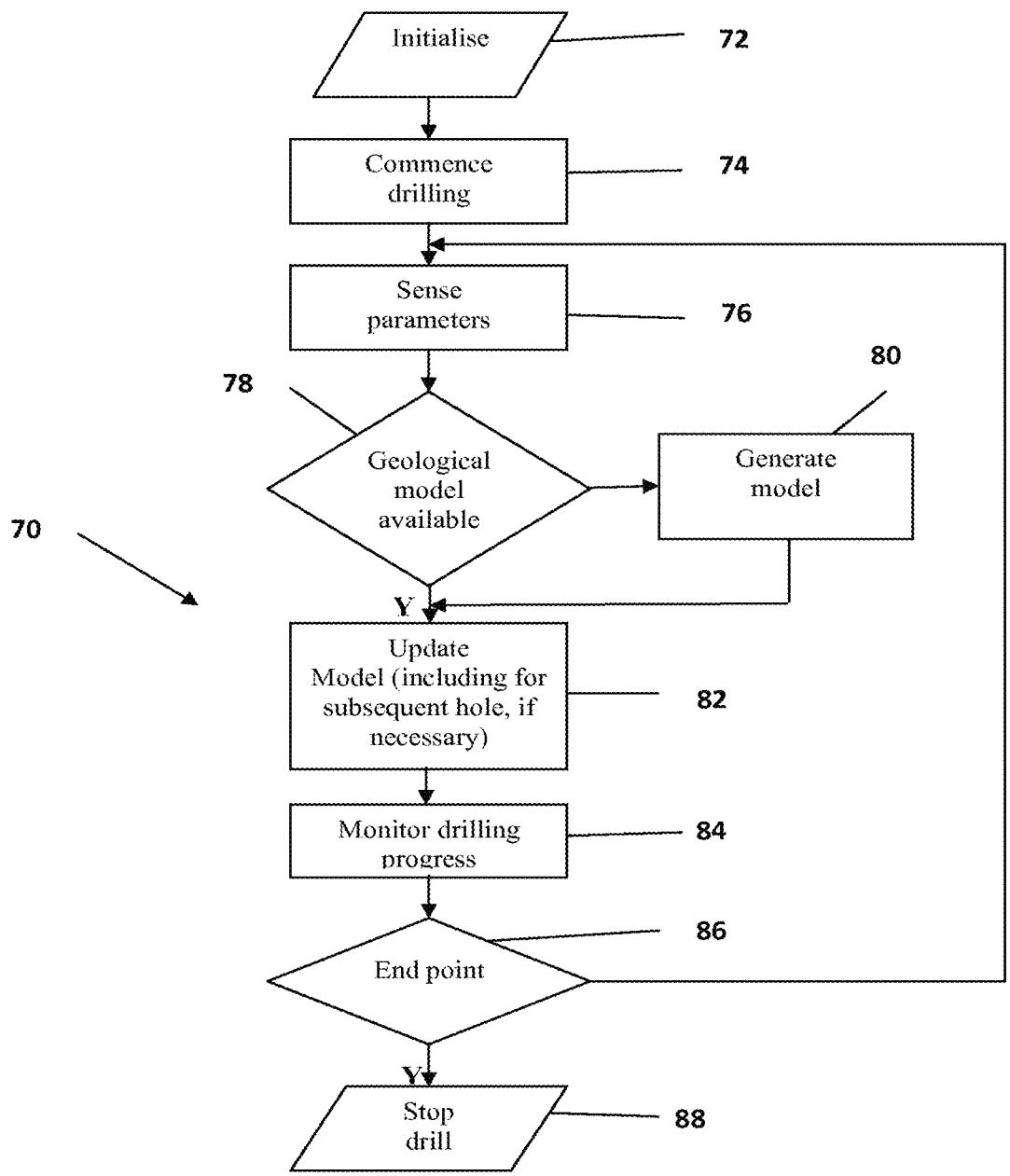
FIG. 4 shows a flow chart of an embodiment of a method of drilling to a position relative to a geological boundary in a geological formation.

In FIG. 4, reference numeral 70 generally designates a flow chart showing an embodiment of a method of drilling to a position relative to a geological boundary in a geological formation. At step 72 of the method, the drilling operation is initialised. Initialisation involves positioning of the drill 10 at the location where a borehole 64 is to be drilled in the bench 54. The initialisation procedure further involves lowering the drill bit 22 into abutment with the surface into which the borehole 64 is to be drilled. The drill bit 22 is lowered under the control of the drill controller 24.

The drilling operation itself then commences at step 74 under control of the drill controller 24. While drilling proceeds, various parameters relating to the drilling operation are sent to the processor module 32 at step 76 using the sensor pack 26. As indicated above, the sensors 26.1-26.$n$ monitor various parameters relating to the drilling operation.

At step 78, the processor 36 determines whether or not a geological model for the bench 54 being drilled is already available. If not, the processor 36 of the processor module 32 generates the model using an algorithm as shown at step 80. The processor 36 of the processor module 32 uses MWD data from the sensor pack 26 in the algorithm to generate the geological model 46 in real time. Data from the sensors 26.1-26.$n$ are used in the algorithm to improve the accuracy of the geological model 46.

If a model 46 already exists, the model 46 is updated at step 82 using the MWD data relating to the sensed parameters received from the sensor pack 26.

The processor module 32 monitors the drilling progress as shown at step 84 and queries at step 86 whether or not the end point for that borehole 64 in the geological map 48 has been reached. As described above, in the case of an autonomous drill 10, the end point is selected by the processor module 32 to be the boundary 62 between the overburden 58 and the seam 60. If the drill 10 is being operated in a non-autonomous mode or, if desired, also when the drill 10 is operated in an autonomous mode, or if it is difficult to infer where the boundary 62 is from the data available in the geological model 46, the end point 63 may be selected by the processor module 32 to be at the stand-off distance 'd' above the boundary 62 so that the drill bit 22 stands off before intersecting the boundary 62. This also inhibits any overshoot of the drill bit 22 and, as a result, inhibits penetration of the seam 60 at all or only to a very minimal extent.

If the processor module 32 determines that the end point has been reached, a command is sent by the processor module 32 to the drill controller 24 to stop drilling as shown at step 88.

If the processor module 32 determines that the end point has not yet been reached, drilling continues, as described above, until the processor module 32 determines that the end point has been reached at which time the drill controller 24 is commanded to stop the drilling operation.

It is to be noted that, in generating the geological model 46, the algorithm used may employ mathematical modelling on sample data derived from data relating to the bench 54. This mathematical modelling may include suitable interpolation techniques or other mathematical techniques such as Gaussian Processes.

It is an advantage of the described embodiments of the disclosure that a method and system are provided which facilitate real time updating of an in-ground geological model to assist in more accurately determining the boundary between overburden and material to be mined. Hence, the likelihood of drilling into the material to be mined and which results in subsequent removal of that material, is reduced. This results in increased recovery of mined material with the resultant improved economics associated with operating the mine.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of mining for a material of interest occurring in a seam under a layer of overburden using a geological model map of a geological formation comprising the layer of overburden and the seam, the geological model map including a desired drilling end point at a pre-defined position relative to a geological boundary between the layer of overburden and the seam, the method comprising the steps of:
   sensing blast hole parameters while a blast hole is being drilled in the geological formation;
   feeding sensed parameters in real time to a drill controller which controls operation of a drill drilling the blast hole;
   using the sensed parameters to locate the position of a drill bit of the drill in the geological formation and its corresponding position within a geological model of the geological formation being drilled;
   using the sensed parameters and the position of the drill bit in the geological model map while drilling is underway also to locate the position of the drill bit of the drill relative to the geological boundary and to the desired drilling end point; and
   using the drill controller to drill to the desired drilling end point and to cause the drill to cease drilling when the desired drilling end point has been reached.

2. The method of claim 1, wherein the blast hole is adapted to be charged with explosives after ceasing the drilling for removal of the overburden when the explosives are detonated.

3. The method of claim 1, further comprising the steps of:
   determining whether or not the geological model is already available; and
   if it is determined that the geological model is not already available, generating the geological model from the sensed parameters; generating the geological model map, including the desired drilling end point, from the geological model; and providing the geological model map to the drill controller.

4. The method of claim 3, wherein, if it is determined that the geological model is already available, updating the geological model, based on which the geological model map is generated, using the sensed parameters.

5. The method of claim 2, further comprising the steps of:
   determining whether or not the geological model is already available; and
   if it is determined that the geological model is not already available, generating the geological model from the sensed parameters; generating the geological model map, including the desired drilling end point, from the geological model; and providing the geological model map to the drill controller.

6. The method of claim 5, wherein, if it is determined that the geological model is already available, updating the geological model, based on which the geological model map is generated, using the sensed parameters.

7. A system for mining for a material of interest occurring in a seam under a layer of overburden using a geological model map of a geological formation comprising the layer of overburden and the seam, the geological model map including a desired drilling end point at a predefined position relative to a geological boundary between the layer of overburden and the seam, the system including:
- a drill controller configured to control operation of a drill drilling a blast hole;
- a sensor pack configured to: sense, while the blast hole is being drilled in the geological formation, parameters associated with the blast hole drilling operation; and feed the sensed parameters in real time to the drill controller;
- a data storage module configured to store a geological model of the geological formation and data relating to the sensed parameters, the geological model including data relating to the geological boundary; and
- a processor module configured to: generate, from the geological model, a geological model map including a desired drilling end point arranged at a pre-defined position relative to the geological boundary; and to locate, using the sensed parameters and the position of a drill bit in the geological model map while drilling is underway, the position of the drill bit of the drill relative to the geological boundary and to the desired drilling end point,
- wherein the drill controller is configured to drill to the desired drilling end point and to cause the drill to cease drilling when the desired drilling end point has been reached.

8. The system of claim 7, wherein the blast hole is adapted to be charged with explosives after ceasing the drilling for removal of the overburden when the explosives are detonated.

9. The system of claim 7, wherein the processor is further configured to:
- determine whether or not the geological model is already available; and
  - if it is determined that the geological model is not already available, generate the geological model from the sensed parameters; generating the geological model map, including the desired drilling end point, from the geological model, and provide the geological model map to the drill controller.

10. The system of claim 9, wherein the processor is further configured to:
- if it is determined that the geological model is already available, update the geological model, based on which the geological model map is generated, using the sensed parameters.

11. The system of claim 8, wherein the processor is further configured to:
- determine whether or not the geological model is already available; and
  - if it is determined that the geological model is not already available, generate the geological model from the sensed parameters; generating the geological model map, including the desired drilling end point, from the geological model, and provide the geological model map to the drill controller.

12. The system of claim 11, wherein the processor is further configured to:
- if it is determined that the geological model is already available, update the geological model, based on which the geological model map is generated, using the sensed parameters.

13. Software that causes a computer to perform the method of claim 1.

14. A drill for drilling a blast hole for mining for a material of interest occurring in a seam under a layer of overburden using a geological model map of a geological formation comprising the layer of overburden and the seam, the geological model map including a desired drilling end point at a predefined position relative to a geological boundary between the layer of overburden and the seam, the drill comprising:
- a drilling platform;
- a support structure mounted on the platform;
- a drilling mechanism displaceably supported by the support structure, the drilling mechanism terminating a drill bit for drilling the blast hole; and
- a drill controller carried on the drilling platform, the drill controller being operative to use parameters sensed during a drilling operation and position of the drill bit in the geological model map, wherein the geological model map is generated from a geological model of the geological formation being drilled,
- wherein the drill controller is configured to cause the drilling mechanism to: drill to the desired drilling end point; and cease drilling when the desired drilling end point has been reached.

15. The drill of claim 12, wherein the blast hole is adapted to be charged with explosives after ceasing the drilling for removal of the overburden when the explosives are detonated.

16. The drill of claim 14, wherein the drill further comprises a sensor pack configured to sense parameters relating to the drilling operation.

17. The drill of claim 16, wherein:
- if the geological model is not already available, the geological model is generated from the parameters sensed by the sensor pack; and the geological model map, including the desired drilling end point, is generated from the geological model; and
- if the geological model is already available, the geological model, based on which the geological model map is generated, is updated using the parameters sensed by the sensor pack.

18. The drill of claim 15, wherein the drill further comprises a sensor pack configured to sense parameters relating to the drilling operation.

19. The drill of claim 18, wherein:
- if the geological model is not already available, the geological model is generated from the parameters sensed by the sensor pack; and the geological model map, including the desired drilling end point, is generated from the geological model; and
- if the geological model is already available, the geological model, based on which the geological model map is generated, is updated using the parameters sensed by the sensor pack.

* * * * *